United States Patent
Song et al.

(10) Patent No.: US 9,959,827 B2
(45) Date of Patent: May 1, 2018

(54) DISPLAY PANEL, DRIVING METHOD THEREOF AND DISPLAY DEVICE

(71) Applicant: Boe Technology Group Co., Ltd., Beijing (CN)

(72) Inventors: Song Song, Beijing (CN); Kazuyoshi Nagayama, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days. days.

(21) Appl. No.: 15/038,007

(22) PCT Filed: Oct. 13, 2015

(86) PCT No.: PCT/CN2015/091825
§ 371 (c)(1),
(2) Date: May 19, 2016

(87) PCT Pub. No.: WO2016/201829
PCT Pub. Date: Dec. 22, 2016

(65) Prior Publication Data
US 2017/0169779 A1  Jun. 15, 2017

(30) Foreign Application Priority Data
Jun. 15, 2015  (CN) .......................... 2015 1 0330663

(51) Int. Cl.
*G09G 3/36* (2006.01)
*G02F 1/1362* (2006.01)
(Continued)

(52) U.S. Cl.
CPC ......... *G09G 3/3648* (2013.01); *G02F 1/1368* (2013.01); *G02F 1/133512* (2013.01);
(Continued)

(58) Field of Classification Search
CPC ......... G02F 1/133512; G02F 1/133514; G02F 1/134363; G02F 1/134309;
(Continued)

(56) References Cited

U.S. PATENT DOCUMENTS

2002/0159016 A1* 10/2002 Nishida ............ G02F 1/134363
349/141
2003/0030381 A1  2/2003 Yamazaki et al.
(Continued)

FOREIGN PATENT DOCUMENTS

CN  1945393  4/2007
CN  101666951  3/2010
(Continued)

OTHER PUBLICATIONS

Office Action in Chinese Application No. 201510330663.4 dated Apr. 28, 2017, with English translation.
(Continued)

*Primary Examiner* — Sanjiv D Patel
(74) *Attorney, Agent, or Firm* — Womble Bond Dickinson (US) LLP (57) ABSTRACT

A black matrix of the display panel comprises N columns of first sub-regions and M columns of second sub-regions, the pixel electrodes comprise N columns of first pixel electrodes in one-to-one correspondence with N columns of first sub-regions and M columns of second pixel electrodes in one-to-one correspondence with M columns of second sub-regions. A width of the M columns of second sub-regions and a width of the M columns of second pixel electrodes along the row direction of the black matrix are increased only by reducing a width of the N columns of first sub-regions along the row direction of the black matrix, such that some signal lines in the divided gate driver may be placed at the M columns of second sub-regions to enable the display panel not having frames at the left and the right, without substantially not changing the aperture ratio of the display panel.

19 Claims, 4 Drawing Sheets

(51) Int. Cl.
*G02F 1/1343* (2006.01)
*G02F 1/1368* (2006.01)
*G02F 1/1335* (2006.01)

(52) U.S. Cl.
CPC .. G02F 1/134336 (2013.01); G02F 1/136209 (2013.01); G02F 1/136286 (2013.01); *G02F 1/134309* (2013.01); *G02F 2201/123* (2013.01); *G02F 2201/40* (2013.01); *G09G 2300/0426* (2013.01); *G09G 2300/0871* (2013.01); *G09G 2310/0218* (2013.01); *G09G 2310/0286* (2013.01)

(58) Field of Classification Search
CPC ......... G09G 2300/0426; G09G 3/3648; G09G 2320/028; G09G 2320/068; G09G 3/2003; G09G 3/32; G09G 3/36; G09G 2300/023; G06F 1/3212; G06F 1/3265; G06F 3/0412; H01L 29/78633
See application file for complete search history.

(56) References Cited

U.S. PATENT DOCUMENTS

| | | | |
|---|---|---|---|
| 2004/0075632 A1 | 4/2004 | Chou et al. | |
| 2009/0015768 A1 | 1/2009 | Igeta et al. | |
| 2010/0001939 A1* | 1/2010 | Ochiai | G02F 1/133512 345/88 |
| 2011/0216169 A1* | 9/2011 | Kim | H01J 9/00 348/51 |
| 2012/0120127 A1* | 5/2012 | Yamaguchi | G09G 3/20 345/690 |
| 2013/0250202 A1* | 9/2013 | Qi | G02F 1/133512 349/58 |
| 2015/0185576 A1* | 7/2015 | Chu | G02F 1/136286 349/43 |
| 2015/0302785 A1 | 10/2015 | Chen et al. | |
| 2015/0346526 A1 | 12/2015 | Chen et al. | |
| 2016/0342042 A1* | 11/2016 | Yu | G02F 1/133514 |
| 2017/0045988 A1* | 2/2017 | Sugita | G06F 3/044 |

FOREIGN PATENT DOCUMENTS

| | | |
|---|---|---|
| CN | 101957522 A | 1/2011 |
| CN | 102403320 | 4/2012 |
| CN | 102403320 A | 4/2012 |
| CN | 103698954 A | 4/2014 |
| CN | 103956131 | 7/2014 |
| CN | 103956131 A | 7/2014 |
| CN | 104865737 | 8/2015 |

OTHER PUBLICATIONS

International Search Report and Written Opinion with English Language Translation, dated Mar. 14, 2016, Application No. PCT/CN2015/091825.

* cited by examiner

DISPLAY PANEL, DRIVING METHOD THEREOF AND DISPLAY DEVICE

RELATED APPLICATIONS

The present application is the U.S. national phase entry of PCT/CN2015/091825, with an international filling date of Oct. 13, 2015, which claims the benefit of Chinese Patent Application NO. 201510330663.4, filed on Jun. 15, 2015, the entire disclosure of which is incorporated herein by reference.

TECHNICAL FIELD

The present invention relates to the field of display technology, particularly to a display panel, a driving method thereof and a display device.

BACKGROUND

A liquid crystal display includes a source driver, a gate driver and a liquid crystal display panel etc. The liquid crystal display panel has an array of pixel electrodes, and the gate driver is used for turning on corresponding rows of pixel electrodes in the pixel electrode array in sequence, so as to transmit the pixel electrode data outputted by the source driver to the pixel electrodes, thereby displaying the image to be displayed.

At present, the gate driver can be formed on an array substrate of the liquid crystal display through an array process, i.e., the process of gate driver on array (GOA), such an integrating process can omit a bonding area for a gate integrated circuit (IC) and a wiring space for a Fan-out, thereby being capable of enabling the liquid crystal display to realize the design of a narrow frame.

In order to further reduce the widths of the left and right frames of the liquid crystal display, even to enable it to realize free of frames at the left and the right, the design of hiding the gate driver in the display area of the liquid crystal display comes up. This design is realized by reducing the area of the light transmission areas in the display area to increase the area of the light shielding areas in the display area, and thereby placing the divided gate driver at the light shielding areas in the display area. Apparently, this design would reduce the aperture ratio of the liquid crystal display.

Therefore, how to enable the liquid crystal display to realize the design of free of frames at the left and the right while reducing the influence to the aperture ratio as much as possible is a technical problem that needs to be solved by the skilled person in the art.

SUMMARY

In view of this, embodiments of the invention provide a display panel, a driving method thereof and a display device, so as to enable the liquid crystal display to realize the design of free of frames at the left and the right on the premise of reducing the influence to the aperture ratio as much as possible.

Therefore, an embodiment of the invention provides a display panel, which may comprise a first substrate and a second substrate arranged opposite to each other, a black matrix located at a side of the first substrate facing the second substrate or located at a side of the second substrate facing the first substrate, and a plurality of pixel electrodes arranged in an array located at the side of the first substrate facing the second substrate, an orthographic projection of the pixel electrode on the first substrate being located within a grid formed by an orthographic projection of the black matrix on the first substrate. The black matrix may comprise N columns of first sub-regions and M columns of second sub-regions, an actual width of each column of the first sub-regions along a row direction of the black matrix is $a_1$, an actual width of each column of the second sub-regions along the row direction of the black matrix is $a_2$; a design width of each column of sub-regions of the black matrix along the row direction of the black matrix is a. The pixel electrodes may comprise N columns of first pixel electrodes in one-to-one correspondence with N columns of the first sub-regions and M columns of second pixel electrodes in one-to-one correspondence with M columns of the second sub-regions. A width of each column of the first pixel electrodes along the row direction of the black matrix is $A_1$, a width of each column of the second pixel electrodes along the row direction of the black matrix is $A_2$, and N, M, $A_1$, $A_2$, $a_1$, $a_2$ and a may meet equation (1) and equation (2):

$$\frac{N(a-a_1)}{M} = (A_2 + a_2) - (A_1 + a_1); \quad \text{equation (1)}$$

$$\left| \frac{A_1}{A_1 + a_1} - \frac{A_2}{A_2 + a_2} \right| \leq c; \quad \text{equation (2)}$$

N and M are positive integers, $A_1$, $A_2$, $a_1$, $a_2$, a and c are positive numbers, $a_1 < a$, c is a first preset value.

In some embodiments, the first preset value may be within a range of 0.1~0.2.

In some embodiments, at least two columns of the second pixel electrodes may be adjacent to each other.

In some embodiments, the display panel may further comprise a plurality of gate lines and a plurality of data lines arranged in cross and insulation located at the side of the first substrate facing the second substrate, a plurality of shift registers in one-to-one correspondence and in electrical connection with the gate lines, a plurality of first signal line groups parallel to the gate lines, in one-to-one correspondence and in electrical connection with the shift registers, and a second signal line group parallel to the data lines and in electrical connection with the first signal line groups. The second signal line group may be located within M columns of the second sub-regions. The black matrix may further comprise a plurality of rows of third sub-regions in one-to-one correspondence with the gate lines. The shift registers and corresponding first signal line groups may be located within the third sub-regions to which the gate lines correspond.

In some embodiments, the second signal line group may comprise a plurality of second signal lines insulated from each other, each of the first signal line groups may comprise a plurality of first signal lines in one-to-one correspondence and in electrical connection with the second signal lines respectively.

In some embodiments, each of the second signal lines may be located within different second sub-regions.

In some embodiments, at least one of the second signal lines may comprise a puerility of second sub signal lines in parallel connection, and the second sub signal lines belonging to a same second signal line may be located in different and adjacent second sub-regions.

In some embodiments, the first signal line groups and the gate lines may be arranged in a same layer.

In some embodiments, the second signal line group and the data lines may be arranged in a same layer.

In some embodiments, the display panel may further comprise a plurality of first thin film transistors in one-to-one correspondence and in electrical connection with the pixel electrodes respectively and located at the side of the first substrate facing the second substrate, each of the shift registers may comprise at least one second thin film transistor, and the second thin film transistors and the first thin film transistors may be arranged in a same layer.

In some embodiments, an aperture ratio of a pixel unit where the first pixel electrode locates may be greater than an aperture ratio of a pixel unit where the second pixel electrode locates, an absolute value of a difference between the two may be greater than a second preset value, and a cell gap at the pixel unit where the first pixel electrode locates may be less than a cell gap at a pixel unit where the second pixel electrode locates; alternatively, an aperture ratio of a pixel unit where the first pixel electrode locates may be less than an aperture ratio of a pixel unit where the second pixel electrode locates, an absolute value of a difference between the two may be greater than a second preset value, and a cell gap at the pixel unit where the first pixel electrode locates may be greater than a cell gap at a pixel unit where the second pixel electrode locates.

In some embodiments, an aperture ratio of a pixel unit where the first pixel electrode locates may be greater than an aperture ratio of a pixel unit where the second pixel electrode locates, an absolute value of a difference between the two may be greater than a second preset value, and a width of the first pixel electrode along a column direction of the black matrix may be less than a width of the second pixel electrode along the column direction of the black matrix; alternatively, an aperture ratio of a pixel unit where the first pixel electrode locates may be less than an aperture ratio of a pixel unit where the second pixel electrode locates, an absolute value of a difference between the two may be greater than a second preset value, and a width of the first pixel electrode along a column direction of the black matrix may be greater than a width of the second pixel electrode along the column direction of the black matrix.

Another embodiment of the invention provides a display device, which may comprise a display panel as provided in any one of the above embodiments.

Another embodiment of the invention provides a driving method for a display panel, which may be the display panel as provided in any one of the above embodiments. The driving method may comprise: within display time of one frame, applying a first voltage to the first pixel electrodes, applying a second voltage to the second pixel electrodes, and applying a common voltage to a common electrode; when an aperture ratio of a pixel unit where the first pixel electrode locates is greater than an aperture ratio of a pixel unit where the second pixel electrode locates, and an absolute value of a difference between the two is greater than a second preset value, an absolute value of a difference between the first voltage and the common voltage is set to be less than an absolute value of a difference between the second voltage and the common voltage; and when an aperture ratio of a pixel unit where the first pixel electrode locates is less than an aperture ratio of a pixel unit where the second pixel electrode locates, and an absolute value of a difference between the two is greater than a second preset value, an absolute value of a difference between the first voltage and the common voltage is set to be greater than an absolute value of a difference between the second voltage and the common voltage.

Embodiments of the invention provide a display panel, a driving method thereof and a display device. The black matrix of the display panel may comprise N columns of first sub-regions and M columns of second sub-regions, the pixel electrodes may comprise N columns of first pixel electrodes in one-to-one correspondence with the N columns of first sub-regions and M columns of second pixel electrodes in one-to-one correspondence with the M columns of second sub-regions. The width of the M columns of second sub-regions along the row direction of the black matrix and the width of the M columns of second pixel electrodes along the row direction of the black matrix may be increased only by reducing the width of the N columns of first sub-regions along the row direction of the black matrix, such that some signal lines in a divided gate driver may be placed at the M columns of second sub-regions to enable the display panel not having frames at the left and the right on the premise of reducing the influence to the aperture ratio (the aperture ratio of the display panel is substantially unchanged).

DETAILED DESCRIPTION OF THE INVENTION

Next, specific implementations of the display panel, the driving method thereof and the display device provided by embodiments of the invention will be explained in detail with reference to the drawings.

In the drawings, the shapes and sizes of respective components do not represent the true proportions thereof, which only aim to schematically explain the embodiments of the invention.

A display panel provided by an embodiment of the invention comprises: a first substrate and a second substrate arranged opposite to each other, a black matrix located at a side of the first substrate facing the second substrate or located at a side of the second substrate facing the first substrate, and a plurality of pixel electrodes arranged in an array located at the side of the first substrate facing the second substrate. An orthographic projection of the pixel electrode on the first substrate is located within a grid formed by an orthographic projection of the black matrix on the first substrate.

Figure 1:
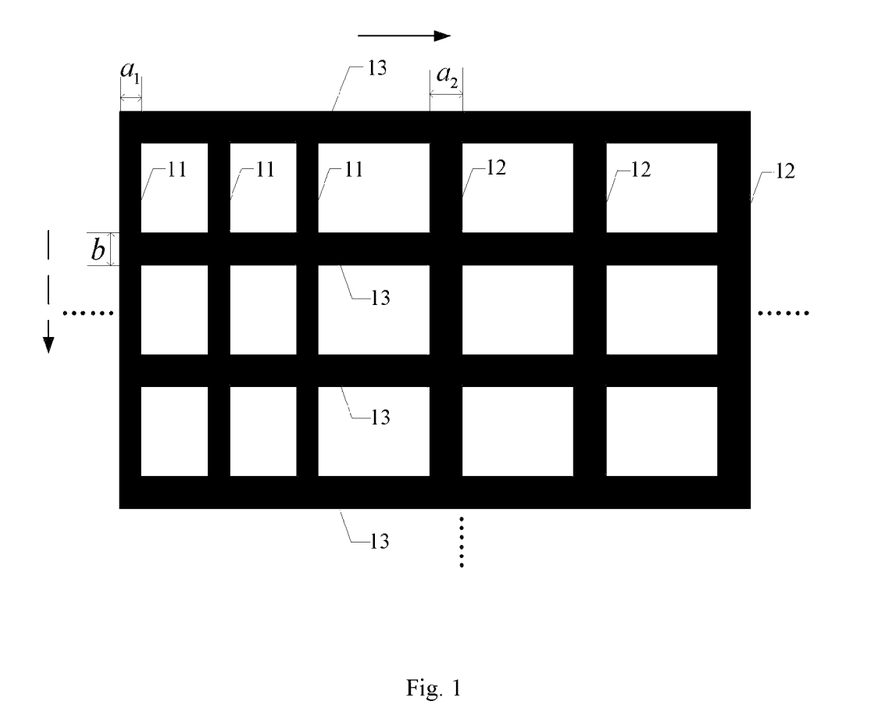
FIG. 1 is a structural schematic view of a black matrix in a display panel provided by an embodiment of the invention.

As shown in FIG. 1, the black matrix comprises N columns of first sub-regions 11 and M columns of second sub-regions 12; an actual width of each column of the first sub-regions 11 along a row direction of the black matrix (the real line arrow direction as shown in FIG. 1) is $a_1$, an actual width of each column of the second sub-regions 12 along the row direction of the black matrix is $a_2$; a design width of each column of sub-regions of the black matrix along the row direction of the black matrix is a.

Figure 2:
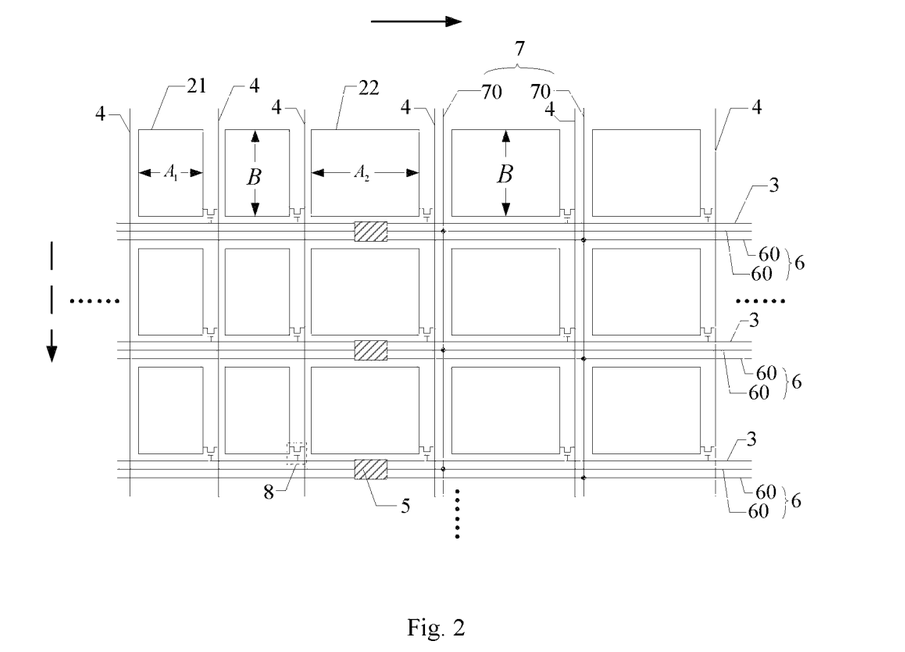
FIG. 2 and FIG. 3 respectively show a structural schematic view of a side of a first substrate in a display panel provided by different embodiments of the invention.
Figure 3:
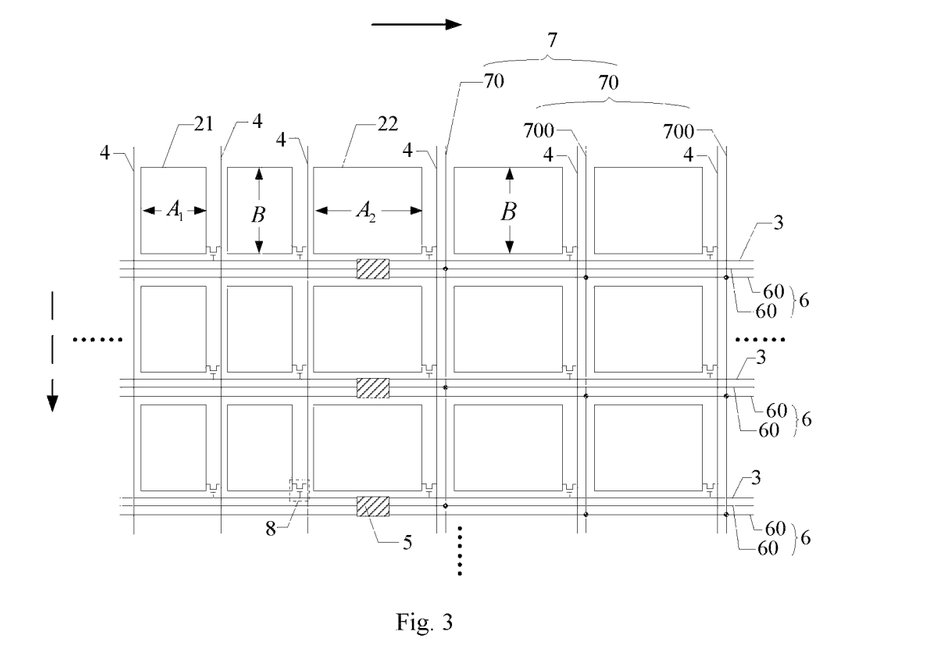

As shown in FIG. 2 and FIG. 3, the pixel electrodes comprise N columns of first pixel electrodes 21 in one-to-one correspondence with N columns of the first sub-regions 11 and M columns of second pixel electrodes 22 in one-to-one correspondence with M columns of the second sub-regions 12; a width of each column of the first pixel electrodes along the row direction of the black matrix (the real line arrow direction as shown in FIG. 2 and FIG. 3) is $A_1$, a width of each column of the second pixel electrodes along the row direction of the black matrix is $A_2$. N, M, $A_1$, $A_2$, $a_1$, $a_2$ and a meet equation (1) and equation (2):

$$\frac{N(a-a_1)}{M} = (A_2 + a_2) - (A_1 + a_1);  \quad \text{equation (1)}$$

$$\left|\frac{A_1}{A_1 + a_1} - \frac{A_2}{A_2 + a_2}\right| \leq c;  \quad \text{equation (2)}$$

wherein N and M are positive integers, $A_1$, $A_2$, $a_1$, $a_2$, a and c are positive numbers, $a_1 < a$, c is a first preset value.

For the display panel provided by the embodiment of the invention, the widths of the M columns of second sub-regions along a row direction of the black matrix and the widths of the M columns of second pixel electrodes along the row direction of the black matrix are increased only by reducing the widths of the N columns of first sub-regions along the row direction of the black matrix, so as to achieve, on the premise of reducing the influence to the aperture ratio (the aperture ratio of the display panel is substantially unchanged), the aim of placing some of the signal lines of the divided gate driver at the M columns of second sub-regions so as to enable the display panel to realize the design of free of frames at the left and the right.

For the existing display panel, the black matrix comprises a plurality of columns of sub-regions in the display area (i.e., the area enclosed by the frames), the widths of the respective columns of sub-regions along the row direction of the black matrix are equal. With regard to the display panel provided by the embodiment of the invention, the above mentioned design widths of each column of sub-regions in the black matrix along the row direction of the black matrix may be the widths of each column of sub-regions of the existing black matrix in the display area along the row direction of the black matrix that is designed to be equal.

Next, the derivation process of the above equation of $$\frac{N(a-a_1)}{M} = (A_2 + a_2) - (A_1 + a_1)$$

provided by the embodiment of the invention will be explained in detail. In this embodiment, the actual width $a_1$ of each column of first sub-regions in the black matrix along the row direction of the black matrix is reduced by $a-a_1$ relative to the design width a, i.e., the actual width $a_1$ of each column of first sub-regions in the black matrix along the row direction of the black matrix in this embodiment is reduced by $a-a_1$ relative to the width a of each column of sub-regions of the existing black matrix in the display area along the row direction of the black matrix, thus the actual width of the N columns of first sub-regions in the black matrix in this embodiment of the invention is reduced by $N(a-a_1)$ relative to the width of N columns of sub-regions of the existing black matrix in the display area along the row direction of the black matrix, the width $N(a-a_1)$ can increase a total width of each column of second sub-regions and each column of second pixel electrodes in this embodiment along the row direction of the black matrix by $$\frac{N(a-a_1)}{M}$$

relative to a total width of each column of first sub-regions and each column of first pixel electrodes in this embodiment along the row direction of the black matrix. For this embodiment of the invention, since the width of each column of second sub-regions along the row direction of the black matrix is $a_2$, the width of each column of second pixel electrodes along the row direction of the black matrix is $A_2$, the width of each column of first sub-regions along the row direction of the black matrix is $a_1$, and the width of each column of first pixel electrodes along the row direction of the black matrix is $A_1$, hence, the difference between the total width of each column of second sub-regions and each column of second pixel electrodes in this embodiment of the invention along the row direction of the black matrix and the total width of each column of first sub-regions and each column of first pixel electrodes in this embodiment of the invention along the row direction of the black matrix is $(A_2+a_2)-(A_1+a_1)$, thus the equation of $$\frac{N(a-a_1)}{M} = (A_2 + a_2) - (A_1 + a_1)$$

can be obtained.

Next, the meaning represented by the equation of $$\left|\frac{A_1}{A_1 + a_1} - \frac{A_2}{A_2 + a_2}\right| \leq c$$

provided by the embodiment of the invention will be explained in detail. As shown in FIG. 2 and FIG. 3, assuming that each of the widths of the first pixel electrode 21 and the second pixel electrode 22 along the column direction of the black matrix (the broken line arrow direction as shown in FIG. 2 and FIG. 3) is B, and as shown in FIG. 1, the black matrix comprises a plurality of rows of third sub-regions 13 in one-to-one correspondence with the gate lines, the width of each row of the third sub-regions 13 along the column direction of the black matrix (the broken line arrow direction as shown in FIG. 1) is b, then the area of the first pixel electrode is $A_1B$, the area of the pixel unit where the first pixel electrode locates is $(A_1+a_1)(B+b)$, the aperture ratio of the pixel unit where the first pixel electrode locates is $$\frac{A_1 B}{(A_1 + a_1)(B + b)},$$

the area of the second pixel electrode is $A_2B$, the area of the pixel unit where the second pixel electrode locates is $(A_2+a_2)(B+b)$, the aperture ratio of the pixel unit where the second pixel electrode locates is $$\frac{A_2 B}{(A_2 + a_2)(B + b)}.$$

Therefore, the absolute value of the difference between the aperture ratio of the pixel unit where the first pixel electrode locates and the aperture ratio of the pixel unit where the second pixel electrode locates is $$\left| \frac{A_1 B}{(A_1 + a_1)(B + b)} - \frac{A_2 B}{(A_2 + a_2)(B + b)} \right|,$$

and the equation of $$\left| \frac{A_1 B}{(A_1 + a_1)(B + b)} - \frac{A_2 B}{(A_2 + a_2)(B + b)} \right| \le d$$

(d denotes a second preset value and is a positive number) can represent that the aperture ratio of the pixel unit where the first pixel electrode locates and the aperture ratio of the pixel unit where the second pixel electrode locates are substantially equal or approximate. The equation of $$\left| \frac{A_1}{(A_1 + a_1)} - \frac{A_2}{(A_2 + a_2)} \right| \le \frac{d(B + b)}{B}$$

can be modified as $$\left| \frac{A_1 B}{(A_1 + a_1)(B + b)} - \frac{A_2 B}{(A_2 + a_2)(B + b)} \right| \le d, \text{ let } c = \frac{d(B + b)}{B}$$

(c denotes the first preset value and is a positive number), then the equation of $$\left| \frac{A_1}{A_1 + a_1} - \frac{A_2}{A_2 + a_2} \right| \le c$$

can be obtained. The equation of $$\left| \frac{A_1}{A_1 + a_1} - \frac{A_2}{A_2 + a_2} \right| \le c$$

can represent that the aperture ratio of the pixel unit where the first pixel electrode locates and the aperture ratio of the pixel unit where the second pixel electrode locates are substantially equal or approximate, hence, the aperture ratio of the display panel provided by the embodiment of the invention will not be reduced by placing the divided gate driver at the display area. In other words, the design of free of frames at the left and the right may be achieved for the display panel provided by this embodiment, and the aperture ratio may be kept substantially unchanged.

In specific implementation, for the display panel provided by the embodiment of the invention, the first preset value c can be determined based on actual circumstances. For example, the first preset value c can be set within a range of 0.1~0.2. In some embodiments, the first preset value c is selected to be a smaller value to achieve a better overall aperture ratio for the display panel.

For the display panel provided by the embodiment of the invention, the column number of the second sub-regions of the black matrix and the column number of the second pixel electrodes can be determined based on the number of the signal lines of the divided gate driver. For example, in a display panel having pixel electrodes of 1080 rows×5760 columns, 200 columns of second sub-regions and 200 columns of second pixel electrodes can be arranged, i.e., about one out of 30 columns of pixel electrodes will be the second pixel electrodes. A column of second sub-region to which this column of second pixel electrodes corresponds may be used for receiving the signal lines of the divided gate driver. In this embodiment, the 200 columns of second pixel electrodes can be distributed in the display panel randomly, in this way, it is very difficult for the human eyes to perceive the influence caused by inconsistent sizes of the first pixel and the second pixel.

In another embodiment of the invention, as shown in FIG. 2 and FIG. 3, at least two columns of second pixel electrodes 22 can be arranged to be adjacent to each other, i.e., a plurality of columns of second pixel electrodes 22 may be concentrated together, in this way, it is convenient to perform compensation for the second pixel electrodes 22. For example, 200 columns of second pixel electrodes may be arranged in a display panel having 1080 rows×5760 columns of pixel electrodes, the 200 columns of second pixel electrodes can be divided into two groups, each group comprises 100 columns of second pixel electrodes, the 100 columns of second pixel electrodes in each group may be adjacent to each other, the two groups are spaced by a plurality of columns of first pixel electrodes.

In some embodiments, as shown in FIG. 2 and FIG. 3, the display panel may further comprise: a plurality of gate lines 3 and a plurality of data lines 4 arranged in cross and insulation located at the side of the first substrate facing the second substrate, a plurality of shift registers 5 in one-to-one correspondence and in electrical connection with the gate lines 3, a plurality of first signal line groups 6 parallel to the gate lines 3, in one-to-one correspondence and in electrical connection with the shift registers 5, as well as a second signal line group 7 parallel to the data lines 4 and in electrical connection with the first signal line groups 6. The second signal line group 7 may be located within M columns of the second sub-regions 12. As shown in FIG. 1, the black matrix may further comprise a plurality of rows of third sub-regions 13 in one-to-one correspondence with the gate lines 3. As shown in FIG. 2 and FIG. 3, the shift registers 5 and corresponding first signal line groups 6 may be located within the third sub-regions 13 to which the gate lines 3 correspond. An integrated circuit can issue an electrical signal to the second signal line group 7, then the electrical signal on the second signal line group 7 can be transmitted to corresponding shift registers 5 through the first signal line groups 6, and a gate scan signal may be applied to corresponding gate lines 3 through the shift registers 5.

In the display panel of some embodiments, as shown in FIG. 2 and FIG. 3, the second signal line group 7 may comprise a plurality of second signal lines 70 insulated from each other. For example, the second signal line 70 can be a signal line for transmitting a clock signal CLK or a signal line for transmitting another clock signal CLKB, etc. Each of the first signal line groups 6 may comprise a plurality of first signal lines 60 in one-to-one correspondence and in electrical connection with the second signal lines 70; the first signal lines 60 may be used for transmitting the electrical signals transmitted on corresponding second signal lines 70 to the shift registers 5.

In an embodiment, all the second signal lines 70 may be arranged with one column of second sub-regions, however, this may increase difficulty in the manufacturing process.

In order to reduce the difficulty in the manufacturing process, in some embodiments of the invention, as shown in FIG. 2 and FIG. 3, the second signal lines 70 can be distributed in different second sub-regions 12, for example, only one second signal line 70 is arranged within one second sub-region 12. For another example, each second sub-region 12 may be provided with one second signal line 70. Alternatively, each of some of the second sub-regions is provided with one second signal line, no second signal line is arranged within other second sub-regions. Specific arrangement of the second signal lines will not be limited herein.

In a display panel provided by another embodiment of the invention, as shown in FIG. 3, at least one second signal line 70 may comprise a plurality of second sub signal lines 700 in parallel connection. The second sub signal lines 700 belonging to the same second signal line 70 may be located in different and adjacent second sub-regions 12. In this way, the width of the second signal line 70 can be increased without increasing the difficulty in the manufacturing process, thereby being capable of reducing resistance of the second signal line 70 and mitigating the problem of signal delay.

In the display panel provided by the embodiment of the invention, since the first signal line groups 6 and the gate lines 3 are parallel to each other, the first signal line groups 6 and the gate lines can be arranged in a same layer, in this way, the manufacturing process for the display panel can be simplified.

In the display panel provided by the embodiment of the invention, since the second signal line group 7 and the data lines 4 are parallel to each other, the second signal line group 7 and the data lines can be arranged in a same layer, in this way, the manufacturing process for the display panel can be simplified.

For the display panel provided by the embodiment of the invention, as shown in FIG. 2 and FIG. 3, it may further comprise a plurality of first thin film transistors 8 in one-to-one correspondence and in electrical connection with the pixel electrodes and located at the side of the first substrate facing the second substrate. Each of the shift registers 5 may comprise at least one second thin film transistor. The second thin film transistors and the first thin film transistors 8 can be arranged in a same layer, i.e., the gate of the second thin film transistor and the gate of the first thin film transistor 8 may be arranged in a same layer, the active layer of the second thin film transistor and the active layer of the first thin film transistor 8 may be arranged in a same layer, the source and drain of the second thin film transistor and those of the first thin film transistors 8 may be arranged in a same layer, in this way, the manufacturing process for the display panel can be simplified.

In some embodiments, each shift register in the display panel may further comprise at least one capacitor, the specific structure of such shift register may be similar to that of the shift register in the existing gate driver, which will not be described in detail here.

For the above display panels provided by the embodiments of the invention, in case the gate driver has a relatively large size, arranging the divided gate driver in the display panel may possibly result in difference between the aperture ratio of the pixel unit where the first pixel electrode locates and the aperture ratio of the pixel unit where the second pixel electrode locates in the display panel. As stated above, such a difference can be reduced by setting the first preset value c to be relatively small. In other embodiments, in order to further reduce such a difference in aperture ratio, light transmissivities at the positions of the two kinds of pixel electrodes can be adjusted to compensate for the influence to the display effect caused by the difference in the aperture ratios of the pixel units where the two kinds of pixel electrodes locate. For example, in case that the aperture ratio of the pixel unit where the first pixel electrode locates is relatively large while the aperture ratio of the pixel unit where the second pixel electrode locates is relatively small, the light transmissivity at the position of the first pixel electrode can be reduced and the light transmissivity at the position of the second pixel electrode can be increased, so that the light transmissivity at the position of the first pixel electrode is less than the light transmissivity at the position of the second pixel electrode, so as to compensate for the influence to the display effect caused by the difference between the aperture ratios of the pixel units where the two kinds of pixel electrodes locate.

Figure 4:
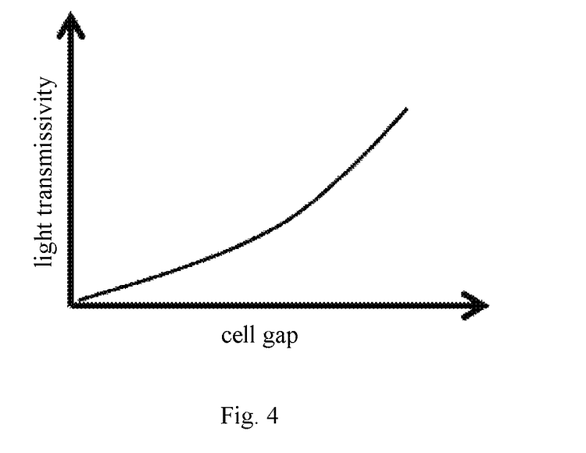
FIG. 4 is a curve diagram of a relationship between a light transmissivity and cell gap of a display panel provided by an embodiment of the invention.

From the curve shown in FIG. 4, which illustrates a relation of the light transmissivity and the cell gap (i.e., the distance between the first substrate and the second substrate) of the display panel, it can be seen that the light transmissivity and the cell gap of the display panel are in positive correlation, i.e., the larger the cell gap of the display panel is, the greater the light transmissivity of the display panel will be. Hence, for the display panel provided by the embodiment of the invention, in case the aperture ratio of the pixel unit where the first pixel electrode locates is greater than the aperture ratio of the pixel unit where the second pixel electrode locates, and the absolute value of the difference between the two is greater than the second preset value d, the cell gap at the pixel unit where the first pixel electrode locates can be set to be less than the cell gap at the pixel unit where the second pixel electrode locates, so that the light transmissivity at the position of the first pixel electrode is less than the light transmissivity at the position of the second pixel electrode, so as to compensate for the influence caused by the difference between the aperture ratios of the pixel units where the two kinds of pixel electrodes locate to the display effect. Similarly, for the display panel provided by the embodiment of the invention, when the aperture ratio of the pixel unit where the first pixel electrode locates is less than the aperture ratio of the pixel unit where the second pixel electrode locates, and the absolute value of the difference between the two is greater than the second preset value d, the cell gap at the pixel unit where the first pixel electrode locates can be set to be greater than the cell gap at the pixel unit where the second pixel electrode locates, so that the light transmissivity at the position of the first pixel electrode is greater than the light transmissivity at the position of the second pixel electrode, so as to compensate for the influence caused by the difference between the aperture ratios of the pixel units where the two kinds of pixel electrodes locate to the display effect.

Figure 5:
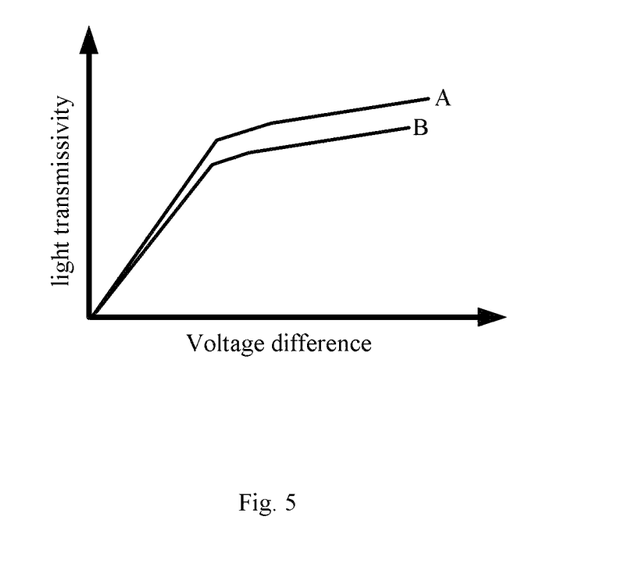
FIG. 5 is a curve diagram showing a relationship of a light transmissivity and a voltage difference between a pixel electrode and a common electrode of a display panel provided by an embodiment of the invention.

FIG. 5 is a curve that illustrates a relation of the light transmissivity and the voltage difference between the pixel electrode and a common electrode, in which the width of the pixel electrode along the column direction of the black matrix represented by curve A is greater than the width of the pixel electrode along the column direction of the black matrix represented by curve B. From FIG. 5 it can be seen that under the condition that the voltage difference between the pixel electrode and the common electrode is constant, the width of the pixel electrode along the column direction of the black matrix and the light transmissivity at the position of the pixel electrode are in positive correlation, i.e., the larger the width of the pixel electrode along the column direction of the black matrix is, the greater the light transmissivity at the position of the pixel electrode will be. Hence, for the display panel provided by the embodiment of the invention, when the aperture ratio of the pixel unit where the first pixel electrode locates is greater than the aperture ratio of the pixel unit where the second pixel electrode locates, and the absolute value of the difference between the two is greater than the second preset value d, the width of the first pixel electrode along the column direction of the black matrix can be set to be less than the width of the second pixel electrode along the column direction of the black matrix, in this way, the electric field applied to the liquid crystal molecules corresponding to the two kind of pixel electrodes can be adjusted so as to adjust the rotation angle of the liquid crystal molecules corresponding to the two kind of pixel electrodes, so that the light transmissivity at the position of the first pixel electrode is less than the light transmissivity at the position of the second pixel electrode, so as to compensate for the influence caused by the difference between the aperture ratios of the pixel units where the two kinds of pixel electrodes locate to the display effect. When the aperture ratio of the pixel unit where the first pixel electrode locates is less than the aperture ratio of the pixel unit where the second pixel electrode locates, and the absolute value of the difference between the two is greater than the second preset value d, the width of the first pixel electrode along the column direction of the black matrix can be set to be greater than the width of the second pixel electrode along the column direction of the black matrix, in this way, the electric field applied to the liquid crystal molecules corresponding to the two kind of pixel electrodes can be adjusted so as to adjust the rotation angle of the liquid crystal molecules corresponding to the two kind of pixel electrodes, so that the light transmissivity at the position of the first pixel electrode is greater than the light transmissivity at the position of the second pixel electrode, so as to compensate for the influence caused by the difference between the aperture ratios of the pixel units where the two kinds of pixel electrodes locate to the display effect.

It should be noted that, for the display panel provided by the embodiment of the invention, the ratio of the second preset value d to the first preset value c is $$\frac{B}{B+b}$$

(B is the width of the first pixel electrode or the second pixel electrode along the column direction of the black matrix, b is the width of each row of third sub-regions in the black matrix along the column direction of the black matrix). Specifically, the second preset value d can be determined based on actual conditions. In some embodiments, the second preset value d is selected to be a smaller value to achieve a better overall aperture ratio for the display panel.

Based on the same inventive concept, another embodiment of the invention provides a display device which may comprise the display panel provided by the above embodiments of the invention. The display device can be any product or component having the function of displaying, such as a mobile phone, a panel computer, a television, a display, a laptop computer, a digital photo frame, a navigator, etc. The implementation of the display device may make reference to the above embodiments of the display panel, which will not be repeated here.

Based on the same inventive concept, an embodiment of the invention provides a driving method for a display panel, the display panel is a display panel described in any of the preceding embodiments. The driving method comprises: within display time of one frame, applying a first voltage to the first pixel electrodes, applying a second voltage to the second pixel electrodes, and applying a common voltage to a common electrode. In case an aperture ratio of a pixel unit where the first pixel electrode locates is greater than an aperture ratio of a pixel unit where the second pixel electrode locates, and an absolute value of a difference between the two is greater than a second preset value d, an absolute value of a difference between the first voltage and the common voltage is set to be less than an absolute value of a difference between the second voltage and the common voltage. In case the aperture ratio of the pixel unit where the first pixel electrode locates is less than the aperture ratio of the pixel unit where the second pixel electrode locates, and an absolute value of a difference between the two is greater than a second preset value d, an absolute value of a difference between the first voltage and the common voltage is set to be greater than an absolute value of a difference between the second voltage and the common voltage.

From the curve showing the relation of the light transmissivity of the display panel and the voltage difference between the pixel electrode and the common electrode as shown in FIG. 5, it can be seen that the light transmissivity of the display panel and the voltage difference between the pixel electrode and the common electrode are in positive correlation, i.e., the larger the voltage difference between the pixel electrode and the common electrode is, the greater the light transmissivity of the display panel will be. Hence, in the above method provided by the embodiment of the invention, when the aperture ratio of the pixel unit where the first pixel electrode locates is greater than the aperture ratio of the pixel unit where the second pixel electrode locates, and the absolute value of the difference between the two is greater than the second preset value, the absolute value of the difference between the first voltage and the common voltage can be set to be less than the absolute value of the difference between the second voltage and the common voltage, in this way, the light transmissivity at the position of the first pixel electrode can be made less than the light transmissivity at the position of the second pixel electrode, so as to compensate the influence caused by the difference between the aperture ratios of the pixel units where the two kinds of pixel electrodes locate to the display effect. Similarly, in the above method provided by the embodiment of the invention, when the aperture ratio of the pixel unit where the first pixel electrode locates is less than the aperture ratio of the pixel unit where the second pixel electrode locates, and the absolute value of the difference between the two is greater than the second preset value, the absolute value of the difference between the first voltage and the common voltage can be set to be greater than the absolute value of the difference between the second voltage and the common voltage, in this way, the light transmissivity at the position of the first pixel electrode can be made greater than the light transmissivity at the position of the second pixel electrode, so as to compensate the influence caused by the difference between the aperture ratios of the pixel units where the two kinds of pixel electrodes locate to the display effect.

For the above method provided by the embodiment of the invention, the second preset value d can be determined based on actual conditions. In some embodiments, the second preset value d is selected to be a smaller value to achieve a better overall aperture ratio for the display panel.

Embodiments of the present invention have provided a display panel, a driving method thereof and a display device. In the display panel, the black matrix comprises N columns of first sub-regions and M columns of second sub-regions, the pixel electrodes comprise N columns of first pixel electrodes in one-to-one correspondence with the N columns of first sub-regions and M columns of second pixel electrodes in one-to-one correspondence with M columns of second sub-regions. The width of the M columns of second sub-regions along a row direction of the black matrix and the width of the M columns of second pixel electrodes along the row direction of the black matrix are increased only by reducing the width of the N columns of first sub-regions along the row direction of the black matrix, so as to achieve, on the premise of reducing the influence to the aperture ratio, the aim of placing some of the signal lines of the divided gate driver at the M columns of second sub-regions so as to enable the display panel to realize the design of free of frames at the left and the right.

Apparently, the person having an ordinary skill in the art can make various modifications and variations to the embodiments without departing from the spirit and the scope of the invention. In this way, provided that these modifications and variations to the embodiments belong to the scopes of the claims of the application and the equivalent technologies thereof, the invention also intends to encompass these modifications and variations.

The invention claimed is:

1. A display panel, comprising:
a first substrate and a second substrate arranged opposite to each other;
a black matrix located at a side of the first substrate facing the second substrate or located at a side of the second substrate facing the first substrate; and
a plurality of pixel electrodes arranged in an array located at the side of the first substrate facing the second substrate, an orthographic projection of the pixel electrode on the first substrate being located within a grid formed by an orthographic projection of the black matrix on the first substrate,
wherein the black matrix comprises N columns of first sub-regions and M columns of second sub-regions, an actual width of each column of the first sub-regions along a row direction of the black matrix is $a_1$, an actual width of each column of the second sub-regions along the row direction of the black matrix is $a_2$; a design width of each column of sub-regions of the black matrix along the row direction of the black matrix is a,
wherein the pixel electrodes comprise N columns of first pixel electrodes in one-to-one correspondence with N columns of the first sub-regions and M columns of second pixel electrodes in one-to-one correspondence with M columns of the second sub-regions, a width of each column of the first pixel electrodes along the row direction of the black matrix is $A_1$, a width of each column of the second pixel electrodes along the row direction of the black matrix is $A_2$,
wherein N, M, $A_1$, $A_2$, $a_1$, $a_2$ and a meet equation (1) and equation (2):

$$\frac{N(a - a_1)}{M} = (A_2 + a_2) - (A_1 + a_1); \quad \text{equation (1)}$$

$$\left| \frac{A_1}{A_1 + a_1} - \frac{A_2}{A_2 + a_2} \right| \le c; \quad \text{equation (2)}$$

wherein N and M are positive integers, $A_1$, $A_2$, $a_1$, $a_2$, a and c are positive numbers, $a_1 < a$, c is a first preset value, wherein at least two columns of the second pixel electrodes are adjacent to each other.

2. The display panel as claimed in claim 1, wherein the first preset value is within a range of 0.1~0.2.

3. The display panel as claimed in claim 1, wherein the display panel further comprises:
a plurality of gate lines and a plurality of data lines arranged in cross and insulation located at the side of the first substrate facing the second substrate;
a plurality of shift registers in one-to-one correspondence and in electrical connection with the gate lines;
a plurality of first signal line groups parallel to the gate lines, in one-to-one correspondence and in electrical connection with the shift registers, and
a second signal line group parallel to the data lines and in electrical connection with the first signal line groups;
wherein the second signal line group is located within M columns of the second sub-regions,
wherein the black matrix further comprises a plurality of rows of third sub-regions in one-to-one correspondence with the gate lines;
wherein the shift registers and corresponding first signal line groups are located within the third sub-regions to which the gate lines correspond.

4. The display panel as claimed in claim 3, wherein the second signal line group comprises a plurality of second signal lines insulated from each other, each of the first signal line groups comprises a plurality of first signal lines in one-to-one correspondence and in electrical connection with the second signal lines respectively.

5. The display panel as claimed in claim 4, wherein each of the second signal lines is located within different second sub-regions.

6. The display panel as claimed in claim 5, wherein at least one of the second signal lines comprises a puerility of second sub signal lines in parallel connection, and the second sub signal lines belonging to a same second signal line are located in different and adjacent second sub-regions.

7. The display panel as claimed in claim 3, wherein the first signal line groups and the gate lines are arranged in a same layer.

8. The display panel as claimed in claim 3, wherein the second signal line group and the data lines are arranged in a same layer.

9. The display panel as claimed in claim 3, wherein the display panel further comprises a plurality of first thin film transistors in one-to-one correspondence and in electrical connection with the pixel electrodes respectively and located at the side of the first substrate facing the second substrate,
wherein each of the shift registers comprises at least one second thin film transistor, and the second thin film transistors and the first thin film transistors are arranged in a same layer.

10. The display panel as claimed in claim 1, wherein an aperture ratio of a pixel unit where the first pixel electrode locates is greater than an aperture ratio of a pixel unit where the second pixel electrode locates, an absolute value of a difference between the two is greater than a second preset value, and a cell gap at the pixel unit where the first pixel electrode locates is less than a cell gap at a pixel unit where the second pixel electrode locates; or,
an aperture ratio of a pixel unit where the first pixel electrode locates is less than an aperture ratio of a pixel unit where the second pixel electrode locates, an absolute value of a difference between the two is greater than a second preset value, and a cell gap at the pixel unit where the first pixel electrode locates is greater than a cell gap at a pixel unit where the second pixel electrode locates.

11. The display panel as claimed in claim 1, wherein an aperture ratio of a pixel unit where the first pixel electrode locates is greater than an aperture ratio of a pixel unit where the second pixel electrode locates, an absolute value of a difference between the two is greater than a second preset value, and a width of the first pixel electrode along a column direction of the black matrix is less than a width of the second pixel electrode along the column direction of the black matrix; or, an aperture ratio of a pixel unit where the first pixel electrode locates is less than an aperture ratio of a pixel unit where the second pixel electrode locates, an absolute value of a difference between the two is greater than a second preset value, and a width of the first pixel electrode along a column direction of the black matrix is greater than a width of the second pixel electrode along the column direction of the black matrix.

12. The display panel as claimed in claim 4, wherein the first signal line groups and the gate lines are arranged in a same layer.

13. The display panel as claimed in claim 5, wherein the first signal line groups and the gate lines are arranged in a same layer.

14. The display panel as claimed in claim 4, wherein the second signal line group and the data lines are arranged in a same layer.

15. The display panel as claimed in claim 5, wherein the second signal line group and the data lines are arranged in a same layer.

16. The display panel as claimed in claim 4, wherein the display panel further comprises a plurality of first thin film transistors in one-to-one correspondence and in electrical connection with the pixel electrodes respectively and located at the side of the first substrate facing the second substrate, wherein each of the shift registers comprises at least one second thin film transistor, and the second thin film transistors and the first thin film transistors are arranged in a same layer.

17. The display panel as claimed in claim 5, wherein the display panel further comprises a plurality of first thin film transistors in one-to-one correspondence and in electrical connection with the pixel electrodes respectively and located at the side of the first substrate facing the second substrate, wherein each of the shift registers comprises at least one second thin film transistor, and the second thin film transistors and the first thin film transistors are arranged in a same layer.

18. A display device comprising a display panel, the display panel comprising:

a first substrate and a second substrate arranged opposite to each other;

a black matrix located at a side of the first substrate facing the second substrate or located at a side of the second substrate facing the first substrate; and a plurality of pixel electrodes arranged in an array located at the side of the first substrate facing the second substrate, an orthographic projection of the pixel electrode on the first substrate being located within a grid formed by an orthographic projection of the black matrix on the first substrate, wherein the black matrix comprises N columns of first sub-regions and M columns of second sub-regions, an actual width of each column of the first sub-regions along a row direction of the black matrix is $a_1$, an actual width of each column of the second sub-regions along the row direction of the black matrix is $a_2$; a design width of each column of sub-regions of the black matrix along the row direction of the black matrix is a, wherein the pixel electrodes comprise N columns of first pixel electrodes in one-to-one correspondence with N columns of the first sub-regions and M columns of second pixel electrodes in one-to-one correspondence with M columns of the second sub-regions, a width of each column of the first pixel electrodes along the row direction of the black matrix is $A_1$, a width of each column of the second pixel electrodes along the row direction of the black matrix is $A_2$, wherein N, M, $A_1$, $A_2$, $a_1$, $a_2$ and a meet equation (1) and equation (2):

$$\frac{N(a-a_1)}{M} = (A_2 + a_2) - (A_1 + a_1); \quad \text{equation (1)}$$

$$\left|\frac{A_1}{A_1 + a_1} - \frac{A_2}{A_2 + a_2}\right| \leq c; \quad \text{equation (2)}$$

wherein N and M are positive integers, $A_1$, $A_2$, $a_1$, $a_2$, a and c are positive numbers, $a_1 < a$, c is a first preset value, wherein at least two columns of the second pixel electrodes are adjacent to each other.

19. A driving method for a display panel, the display panel comprising:

a first substrate and a second substrate arranged opposite to each other;

a black matrix located at a side of the first substrate facing the second substrate or located at a side of the second substrate facing the first substrate; and a plurality of pixel electrodes arranged in an array located at the side of the first substrate facing the second substrate, an orthographic projection of the pixel electrode on the first substrate being located within a grid formed by an orthographic projection of the black matrix on the first substrate, wherein the black matrix comprises N columns of first sub-regions and M columns of second sub-regions, an actual width of each column of the first sub-regions along a row direction of the black matrix is $a_1$, an actual width of each column of the second sub-regions along the row direction of the black matrix is $a_2$; a design width of each column of sub-regions of the black matrix along the row direction of the black matrix is a, wherein the pixel electrodes comprise N columns of first pixel electrodes in one-to-one correspondence with N columns of the first sub-regions and M columns of second pixel electrodes in one-to-one correspondence with M columns of the second sub-regions, a width of each column of the first pixel electrodes along the row direction of the black matrix is $A_1$, a width of each column of the second pixel electrodes along the row direction of the black matrix is $A_2$, wherein N, M, $A_1$, $A_2$, $a_1$, $a_2$ and a meet equation (1) and equation (2):

$$\frac{N(a-a_1)}{M} = (A_2 + a_2) - (A_1 + a_1); \quad \text{equation (1)}$$

$$\left|\frac{A_1}{A_1 + a_1} - \frac{A_2}{A_2 + a_2}\right| \leq c; \quad \text{equation (2)}$$

wherein N and M are positive integers, $A_1$, $A_2$, $a_1$, $a_2$, a and c are positive numbers, $a_1$<a, c is a first preset value, wherein the method comprises:

within display time of one frame, applying a first voltage to the first pixel electrodes, applying a second voltage to the second pixel electrodes, and applying a common voltage to a common electrode;

wherein when an aperture ratio of a pixel unit where the first pixel electrode locates is greater than an aperture ratio of a pixel unit where the second pixel electrode locates, and an absolute value of a difference between the two is greater than a second preset value, an absolute value of a difference between the first voltage and the common voltage is set to be less than an absolute value of a difference between the second voltage and the common voltage;

when an aperture ratio of a pixel unit where the first pixel electrode locates is less than an aperture ratio of a pixel unit where the second pixel electrode locates, and an absolute value of a difference between the two is greater than a second preset value, an absolute value of a difference between the first voltage and the common voltage is set to be greater than an absolute value of a difference between the second voltage and the common voltage.

* * * * *